US008545046B2

(12) United States Patent
Ng

(10) Patent No.: US 8,545,046 B2
(45) Date of Patent: Oct. 1, 2013

(54) MULTI-COLOR INDICATOR LIGHTING

(76) Inventor: James K. Ng, Seattle, WA (US)

( * ) Notice: Subject to any disclaimer, the term of this patent is extended or adjusted under 35 U.S.C. 154(b) by 0 days.

(21) Appl. No.: 12/628,178

(22) Filed: Nov. 30, 2009

(65) Prior Publication Data

US 2011/0128729 A1 Jun. 2, 2011

(51) Int. Cl.
*B60Q 1/26* (2006.01)

(52) U.S. Cl.
USPC ........... 362/231; 362/477; 362/540; 362/510; 362/311.02; 362/800

(58) Field of Classification Search
USPC ................. 362/231, 308, 477, 540, 510, 248, 362/311.01, 311.02, 296.05, 296.07, 309, 362/303, 302, 305, 232, 249.02, 249.11
See application file for complete search history.

(56) References Cited

U.S. PATENT DOCUMENTS 7,018,081 B2 * 3/2006 Hopkins ....................... 362/477
7,021,801 B2 * 4/2006 Mohacsi ....................... 362/477
7,473,014 B2 * 1/2009 Katoh et al. .................. 362/332
7,758,219 B2 * 7/2010 Burke ........................... 362/477

* cited by examiner

*Primary Examiner* — Jong-Suk (James) Lee
*Assistant Examiner* — Leah S Macchiarolo
(74) *Attorney, Agent, or Firm* — Jeffrey Pearce

(57) ABSTRACT

A light for multi-color indication, for example, as navigation light, has a light source with a plurality of LEDs on a common substrate, within a common package and a common package lens. The LEDs may be of different colors. A reflector may be mounted opposite the light source to direct "mixed-color" light through differently colored portions of a casing lens. A reflective surface of the reflector may be shaped substantially as a surface of rotation. A reflective material such as a film may be positioned on the casing lens to extend over at least part of an angular range of any of the lens portion(s) corresponding to an unneeded light color, so as to reflect incident light towards a selected one of the lens portions corresponding to a needed light color.

7 Claims, 5 Drawing Sheets

MULTI-COLOR INDICATOR LIGHTING

FIELD OF THE INVENTION

This invention relates in general to electric lighting and more particularly to lighting that uses different colors to indicate, for example, the nature, status, position, orientation, etc., of the object bearing the lighting.

BACKGROUND OF THE INVENTION

Differently colored lights have been used as indicators for a very long time. Sometimes, colors indicate absolute or relative position, such as that a viewer is in a "dangerous" as opposed to a "safe" sector. Every nighttime driver knows the difference between red tail lights and white headlights.

As another example, in 1848 the United Kingdom began requiring certain ships to display red and green navigation sidelights on their port and starboard sides, respectively; this rule was adopted internationally in 1898. Nowadays, the International Regulations for Preventing Collisions at Sea 1972 (COLREGS) published by the International Maritime Organization (IMO) specify which lights of which colors may/must be displayed by vessels of different types, lengths, etc. For most categories, for example, a vessel underway from sunset to sunrise must display a red sidelight whose light is visible from straight ahead (0°) to 22.5° abaft the starboard beam, that is, 112.5° arc, a green sidelight visible from 0° to 22.5° abaft the port beam, and a white stern light visible over the remaining 135° arc centered on the stern.

As for visibility, COLREGS, Part C ("Lights and Shapes"), Rule 22 ("Visibility of Lights") (b), specifies, for example, the following minimum visibility ranges for navigational lights for vessels of 12 meters or more in length but less than 50 meters in length:

- a masthead light, 5 nautical miles (nm), except that where the length of the vessel is less than 20 meters, 3 nm;
- a sidelight, 2 nm;
- a sternlight, 2 nm; a towing light, 2 nm;
- a white, red, green or yellow all-round light, 2 nm.

For the sake of compactness, wiring simplicity, etc., especially smaller vessels often use lights that combine two or more colors in a single fixture. For example, a single red/green light can be mounted on the centerline at the bow of the boat, or a sailboat less than 20 m in length may have a tri-color light at the top of the mast.

FIG. 1 illustrates a dual-color light fixture 10 as is found mounted on the bow pulpit of many power and sailboats: A casing 15 includes a rear mounting plate 20 that has some kind of mount or bracket 22 and is often joined with top and bottom plates 30, 32. A translucent lens member 40, most commonly made of plastic such as polycarbonate, or high-impact glass, extends in an arc from either side of the rear mounting plate 20 and between the top and bottom plates 30, 32. The angular range of the translucent lens member 40 is typically about 2*(90+22.5)°=225° to meet the COLREGS visibility requirements.

In known lights of the type shown in FIGS. 1-3 an incandescent bulb 50 is mounted in a fitting 52 to serve as the light source. A cap 60 or knob or the like allows an electrical cable 70 to reach the fitting 52 and typically seals the bottom of the lamp so that it is water-proof.

FIGS. 2 and 3 illustrate how known lamps create different light colors in different sectors. As illustrated, the translucent lens member 40 comprises different portions, one for each desired light color. In the illustrated example, these are a red portion 40R and a green portion 400. The light source 50 typically creates light with a broad spectrum (as close as possible to "white," indicated in the figure by "W") that includes substantial energy at red and green wavelengths for the required visibility at the specified distance. Since the colored translucent lens portions 40R, 400 act as filters, as viewed from the port side the light 10 will shine red and as viewed from the starboard side the light 10 will shine green.

Of course, the translucent lens member 40 may be divided into more than two portions, and different colors may be used besides red and green. In a masthead tri-color light, for example, the translucent lens will extend essentially 360°, with a clear portion 40W (FIG. 3) facing aft so as to create the required white stern light. Moreover, the translucent lens member 40 is often not smooth or necessarily uniformly thick, but rather may have ridges or frosting or other features so as, for example, to create a lens effect to aid in focusing and aiming the light and improving its visibility within certain vertical and or horizontal planes.

As mentioned, each colored portion 40R, 400 of the translucent lens 40 acts as a filter to pass the respective intended color (that is, range of wavelength) of light from the source 50. This makes it possible to use a single light source 50 (one or maybe even more bulbs or other light-emitting elements) yet still have light of different desired colors from a single light, but it also carries a clear disadvantage: To filter out unwanted wavelengths also means to reduce the intensity of the light that otherwise would pass through the translucent lens 40.

As a result, given known lights of the type illustrated in FIGS. 1-3 with typical lens 40 thicknesses, materials, surfaces, etc., to achieve the 2 nm visibility required by the COLREGS, the light source 50 usually needs to be at least 10 Watts incandescent for "white" light through a substantially non-colored or clear lens portion, and at least 25 Watts incandescent for red and green. If a single white light source 50 is used for all sectors/lens portions, then this means that at least 25 W incandescent is required. By way of example, if one were to run such a light for even ten hours during a night passage on a recreational boat with a standard 12V dc electrical system, then this would drain at least (25/12)10=21 Ampere-hours from the battery bank, which is a significant drain for only one light.

FIG. 4 shows one known way to reduce the effect of this disadvantage: Instead of a single-color light source 50, a light source 90 is included in the form of an arrangement of individual LEDs such that red LEDs aim out through the red portion 40R of the lens 40 and green LEDs aim out through the green portion 400. One disadvantage of this arrangement is that correct mounting of the many LEDs on some substrate such as PCB material complicates the manufacturing process—each LED will require two solder joints, one for each electrode, and also must be correctly aligned so as to shine in the intended direction. Moreover, the substrate often has a complicated shape, such as being cylindrical or different planes, etc. To prevent misdirection and waste of light, each group of LEDs may also be provided with—usually mounted within—a dedicated backing reflector (analogous to a standard flashlight or car headlight reflector) that aims their light according to a desired pattern; this further complicates the manufacturing process.

What is needed is a light that reduces or eliminates some or all of the shortcomings of existing multi-color indicator lighting.

DETAILED DESCRIPTION

Various aspects of the invention are described below primarily using the example of a multi-color light suitable for use in a maritime environment, such that the example could be used to replace and improve upon the lights shown in FIGS. 1-4. This is purely by way of example and ease of explanation. Structural elements shown in FIGS. 1-3 that may also be used in embodiments of this invention are referred to below with the same reference numbers in FIG. 7.

One advantage of using this environment as an example is that it is particularly demanding. Nonetheless, marine lighting is only one area in which the different aspects of the invention will be useful—as both users and skilled lighting designers will appreciate, the improvements provided by this invention may be applied to other situations as well in which it is desired to have efficient multi-color indicator lighting.

Figure 5:
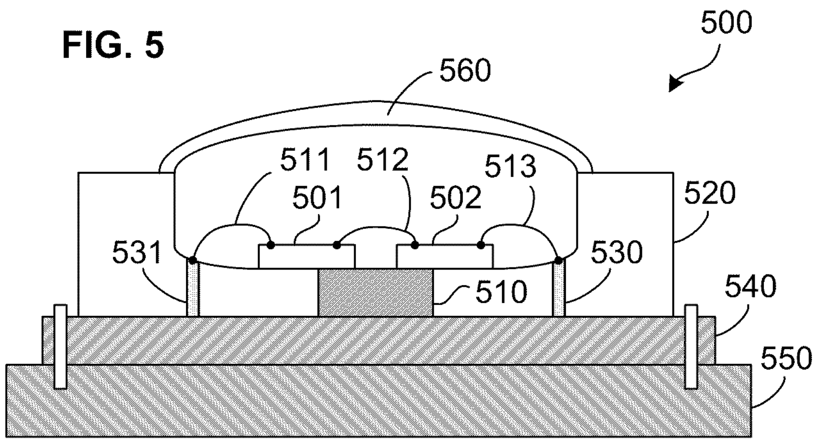
FIG. 5 illustrates the general structure of multiple LED elements in a single package.

FIG. 5 illustrates a common LED "package" 500 containing multiple, possibly differently colored "dies" 501, 502, that is, light-emitting diode elements. In FIG. 5, only two such dies are illustrated, but as is known in the art of LED fabrication, the number can be greater and will depend on the specified needs of a given use of the LED arrangement.

The dies 501, 502 will typically be mounted on a metallic base 510 held by a non-conductive supporting member 520. As the figure shows, the dies 501, 502 may be electrically connected with each other and a typically aluminum PCB 540 by conductors 511, 512, 513 and conductive vias or electrodes 530, 531. The PCB 540 may also be mounted on a heat sink 550. A lens 560 is mounted over the various LED dies 501, 502. Other components will usually also be included in a multi-die LED package such as package 500, but are not shown in the figures for the sake of simplicity and clarity—LED designers know what other parts will be needed. The main point to be illustrated in FIG. 5 is that multiple dies may be included in a single, common package, such that the package functions essentially as a unit. In addition to other advantages mentioned in this description, this configuration has the added advantages of avoiding the need for expensive flexible printed circuit boards and the large numbers of individual LEDs that are normally needed to meet specifications for brightness and horizontal angular coverage.

Figure 6:
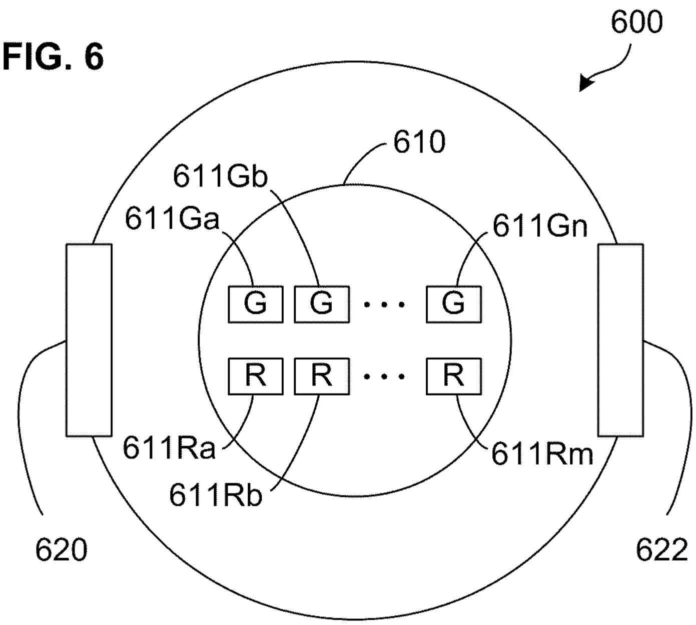
FIG. 6 illustrates just one possible arrangement of multiple LED elements of different colors within a common package.

FIG. 6 illustrates a multi-die, multi-color LED package 600, which may, for example, be fabricated as illustrated in FIG. 5. In the illustrated example, a common substrate 610 supports both green and red LED dies (or "elements"): Green dies are labeled 611Ga, 611Gb, . . . , 611Gn, and red dies are labeled 611Ra, 611Rb, . . . , 611Gm. The collective set of dies/LED elements is referred to with the single reference number 611 below just for simplicity. Note that it is not necessary for m=n, that is, there may be different numbers of dies for different colors. Of course, there may be more and/or different colors of LED dies than what are shown in FIG. 6, but this simple example will serve to support the later description of aspects of the invention. It is also not necessary for the LEDs to be in "rows"; rather, as just one alternate design choice, one could arrange the LEDs in a substantially circular pattern on a rounded or scalloped or "star-shaped" substrate.

Common electrodes (for example, "legs" 620, 622, portions of a screw-in or bayonet fitting, etc.) may lead electrical current to and from the entire set of dies 611. The lens 560 (FIG. 5) then will help direct the light from all the LED elements 611, and also function to securely encapsulate them. In summary, FIGS. 5 and 6 illustrate how a single LED package may contain many different LED elements (dies) of different colors, with common electrodes 620, 622 for current/voltage supply.

Figure 7:
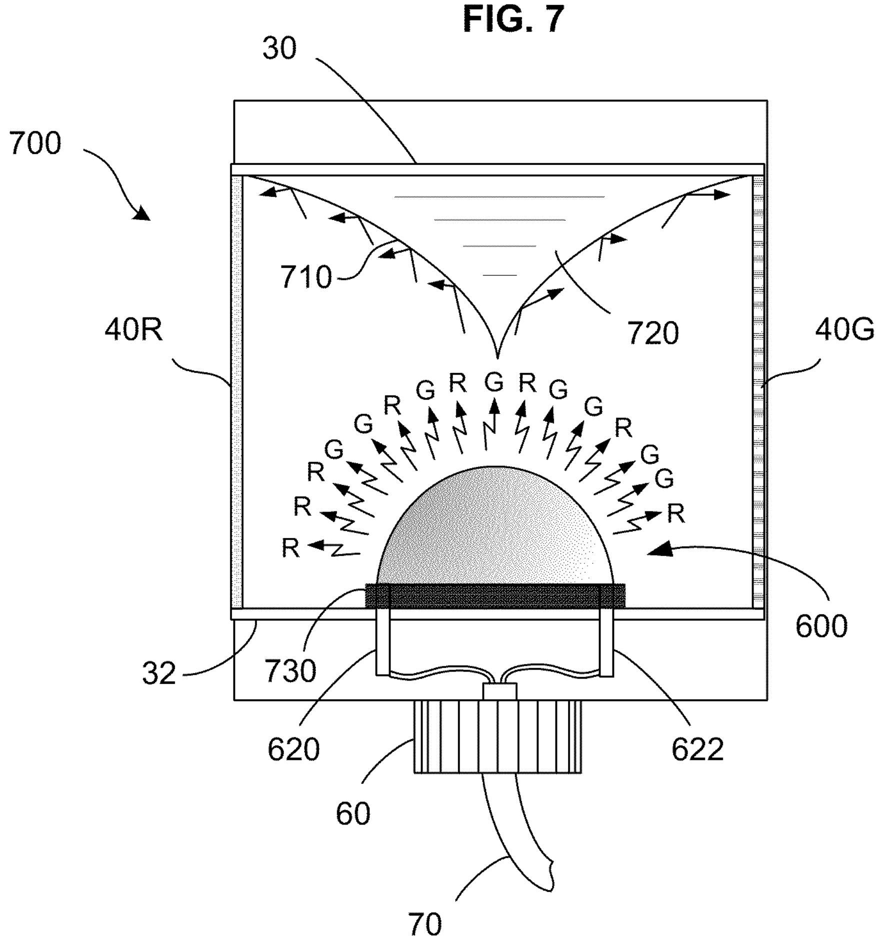
FIG. 7 illustrates a lighting arrangement according to one embodiment of the invention.

FIG. 7 illustrates one example of a light 700 that includes aspects of the invention. Again, components with reference numbers the same as those in FIG. 1 can be assumed to be the same or analogous. The multi-die, multi-color common LED package/device 600 is mounted within the overall casing such that its electrodes 620, 622 are fitted into any known fixture 710 so as to be in electrical contact with respective conductors in the power/voltage/current supply cable 70.

As is indicated by the different "R" and "G" arrows, the LED device 600 will radiate two (in this example) different primary light colors (wavelengths) simultaneously from the common package, since the different dies will be energized commonly. This "combined" light will then pass to both the green and red portions 40G, 40R of the lens, where the green lens portion 40G will pass most (minus absorption and reflection) of the green light but block most of the red light; similarly, the red lens portion 40R will pass most of the red light but block the green.

In other words, no structure is required to separate or isolate the different wavelengths at the source. Since the different LED elements (the dies) are in a common package, there is no need for complicated individual mounting and alignment and soldering of individual LEDs, no need for separate reflectors (a particular advantage where small overall size is important) for different colors, etc.

Note that one advantage of using LEDs is that they can be fabricated to radiate light in a much narrower wavelength band than an incandescent or fluorescent bulb, so that more of the applied electrical energy is converted into light that can actually be transmitted through the lens 40. In other words, not only are LEDs more electrically efficient in general (much less heat loss, etc.) as is known in the art, but they also are more efficient in that they cause much less waste of energy by radiating since they radiate more light of desired wavelengths. Another advantage of LEDs is that they are usually much more compact than other technologies, such that more light-radiating devices can be fit in the same space as a bulb. Compactness and efficiency are improved even further if the different light-generating elements are formed as different dies in a common package as illustrated in FIGS. 5 and 6.

In the case of the tricolor indicator light with red, green, and clear (that is, "white" or non-colored) lens portions, the LED package 600 would contain at least one red die, one green die, and a "white" LED. Note that a "white" LED typically is fabricated using a blue LED die with a specific phosphorus compound; in other words, a "white" LED typically radiates a combination of "blue" and "yellow." The LED device 600 will then radiate red, green, blue, and yellow light colors (wavelengths) simultaneously from the common package, since the different dies may be energized commonly. (Note that the spectrum for yellow LED light will typically be much broader than for red or green.) This "combined" light will then pass the green, red, and clear portions of the lens. The green lens portion 400 will pass most (minus absorption and reflection) of the green light but block most of the other light; similarly, the red lens portion 40R will pass most of the red light but block other colors of light, and the clear lens portion 40W will pass most of the "white" light as perceived by human eyes.

Note that it will not matter if red and green light also passes through the clear lens portion 40W: Since LED "white" is typically a combination of blue and yellow spectral regions, the addition of red and green to the spectrum will actually make the light appear more "white" to the human eye. Similarly, the inclusion of red and green LEDs along with the white LEDs would make the combined light appear more white to the human eye.

Figure 8:
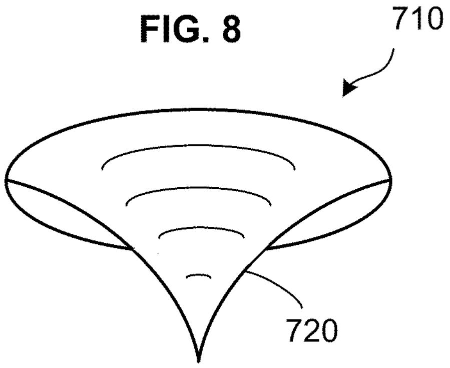
FIG. 8 illustrates a reflector.

According to another aspect of an embodiment, the light includes a common reflector 710. The surface 720 of the reflector 710 is preferably as reflective as possible, but this will depend on how much cost and manufacturing effort one wishes to devote to this. The reflector 710 may be annular, but may also have some other shape depending on the shape of the overall light casing, the desired light pattern, etc. The reflector need also not be purely conical, that is, with a "straight line" surface from base to tip, but may instead be given whatever curvature is desired to reflect incident light in a desired pattern. It would also be possible to truncate the tip of the reflector if this would have some advantage in a given implementation. FIG. 8 illustrates just one example of a reflector 710, whose surface 720 is a concave surface of rotation.

As FIG. 7 illustrates, the light that does not pass directly to the lens 40 (portions 40G and 40R) from the common device 600 will be reflected by the reflector 710 and directed radially (generally outward from the axis of rotation of the reflector) outward to the lens 40. This has at least two advantages over an embodiment (possible) that excludes the reflector 710. First, light that would otherwise be directed "upward" will not be lost or as greatly attenuated, but rather will be reflected to the lens.

Second, the surface 720 of the reflector 710 can be made such as to improve the ability to keep the transmitted light in a required or desired elevational range. For example, in maritime uses, there is little point directing navigational light over a broad range of elevation: Very few observers will ever be more than about 25 meters above the sea surface, so beyond 100 meters most light aimed more than about 15° up will be wasted energy, as will light directed at the seas surface close to the vessel. Thus, for marine navigation lights, most light should be directed in a narrow elevational range "aimed" about ±25° with respect to the horizon. Normal design and geometrical methods may be used to calculate or otherwise determine the appropriate surface geometry of the reflector. Of course, other environments than the maritime will have other requirements, and the reflector 710 surface 720 may then be chosen accordingly. An additional, secondary optical lens may also be used to improve the performance of the light in the radial or other directions in conjunction with the reflector 710, or independently.

As mentioned above, more than two colors may be included in the common LED package, and the invention may be used even when the desired colors are other than red or green. In a tri-color masthead light, for example, dies for "white" LEDs may also be included in the common package along with red and green. As is known, "white" LEDs may in fact themselves be composites with spectrum peaks in the yellow and blue wavelength regions. The white light will then be emitted from the common device "mixed" with the green and red. The clear or at least non-colored rear lens portion 40W (see FIG. 2B) extending over the COLREGS-specified arc will then pass this white light. The white light will also "help" the red and green some, since it will also contain some energy in the red and green wavelength regions. Similarly, the red and green would "help" make the white LED appear more "white" to the human eye.

Figure 1:
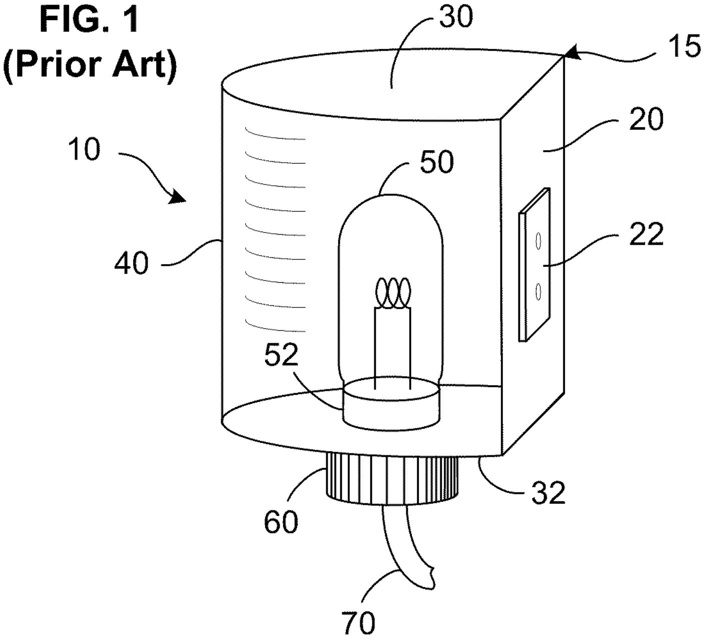
FIG. 1 (Prior Art)
FIGS. 1-3 illustrate features of typical multi-color indicator lights according to the prior art, such as is used on water vessels, with an incandescent bulb as a light source.
Figure 2:
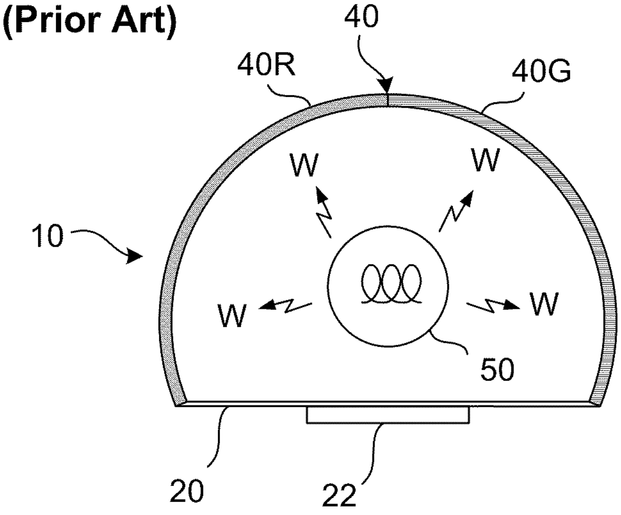
FIG. 2 (Prior Art)
Figure 3:
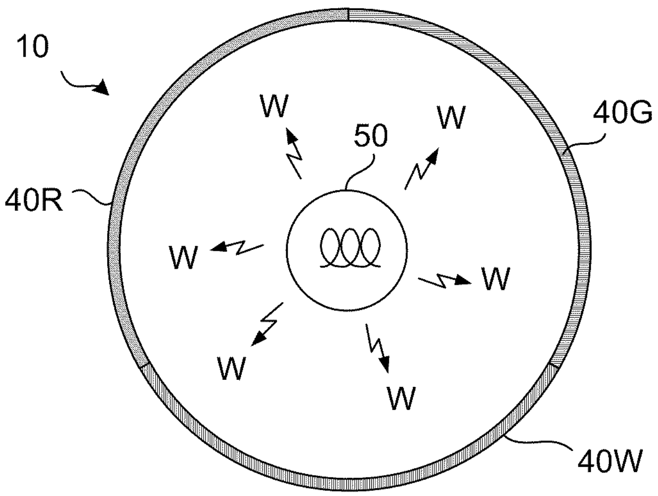
FIG. 3 (Prior Art)
Figure 4:
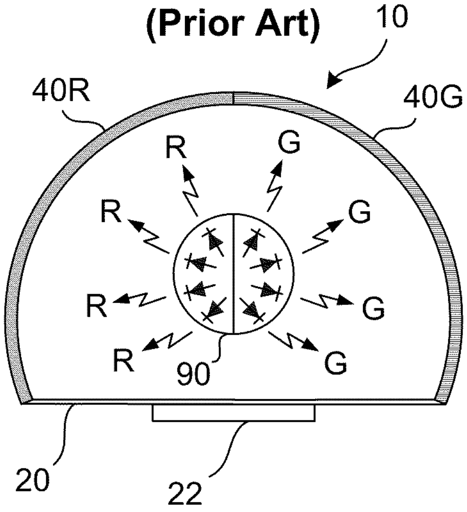
FIG. 4 (Prior Art)
FIG. 4 illustrates a prior art multi-color indicator light in which different-colored but directionally mounted LEDs are used instead of the white incandescent bulb in FIGS. 1-3.

In the prior art light shown in FIG. 4, the bulb or other container in which the combined but individual LEDs are included must be properly installed—little light would be visible if the green LEDs shine towards the red lens portion 40R and the red LEDs shine toward the green lens portion 400. Some arrangement such as bulb indexing or visible markings is therefore usually necessary to ensure that the user installs the bulb correctly, and in many cases even this would not work.

As can be appreciated from FIGS. 6 and 7, depending on the otherwise desired configuration, not only is it unnecessary for the sake of the invention to position the dies 611 in any particular pattern, but it would also not be necessary to index the common package, and it would not matter how the user installs it—the "mixed" red/green light is efficiently "separated" by different parts of the invention, with little waste.

The vertical separation between the top of the common LED device 600 and the tip of the reflector 720 need not be as shown in FIG. 7, but could also be made less or greater. The desired separation will depend in part on which light pattern the light should ideally follow and can be determined using known development methods and simple geometry. In the illustrated example, note that reflector 710 is not located within or behind the light source 600, but rather is mounted in a location "ahead of" or "above" (viewed as in FIG. 6), that is, opposite the light source within the casing.

As an example of the improved efficiency provided by various aspects of the invention, one prototype of an embodiment similar to the one shown in FIG. 7 was able to achieve 2 nm visibility using only about 1 Watt of electrical power for each of a set of one red, one green and one white LED element.

Figure 9A:
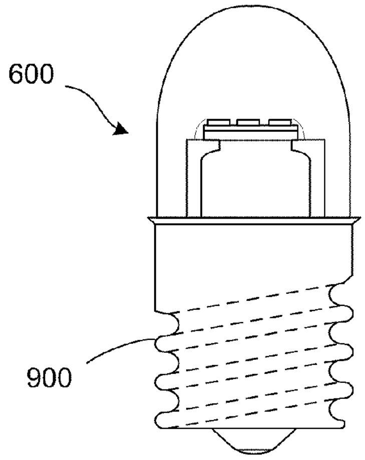
FIGS. 9A and 9B illustrate different fittings that can enable a light configured according to embodiments to be used as an after-market replacement for known light bulbs.
Figure 9B:
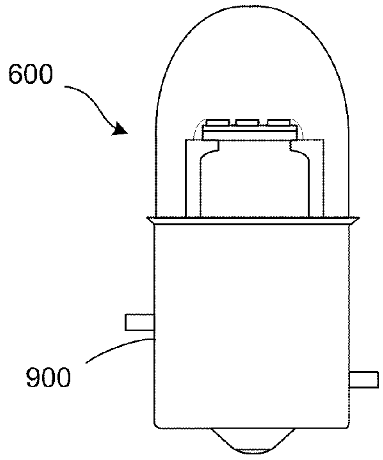

The invention may of course be included in original lights, but its compactness and efficiency also make it well-suited to replace bulbs with less efficient technologies (for example, incandescent) in existing light fittings. In other words, the various aspects of the invention can be used to make after-market, high-efficiency light bulb replacements. FIGS. 9A and 9B illustrate (not necessary to scale) this possible implementation. In such implementations, the light 600 would be provided with a fitting (for example, screw-in as in FIG. 9A, bayonet—indexed or not—as in FIG. 9B, etc.) 900, adapted to a fixture 730 (see FIG. 7), with suitable electrodes 620, 622, to fit the existing bulb socket and lead electrical current to the LED dies. In such applications, the invention's "mixture" of differently colored LED elements (dies) in a common and commonly energized package means that, for the sake of the invention, special bulb alignment will not be necessary—the invention does not require, for example, red LEDs to face the red lens portion, etc.

Figure 10:
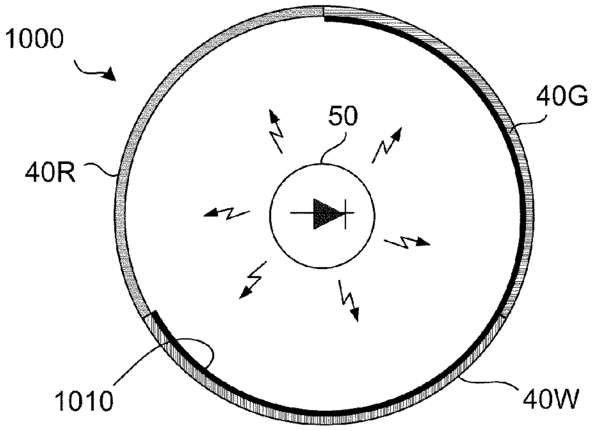
FIG. 10 illustrates an embodiment of a light that includes a lateral reflective film.

FIG. 10 illustrates a feature that can further improve visible light intensity using lateral reflectivity. Assume by way of example that the light is to provide red light visible in the sector covered by lens 40R. In this case, a reflective member such as reflective film 1010 is provided on the light casing opposite this sector over all or at least some angular range of the remaining part of the light casing corresponding to "unneeded" colors of the given, otherwise multi-color light housing. In FIG. 10, the reflective film 1010 covers the entire (360−90−22.5)°=247.5° arc, although this is not necessary and less may be covered, for example, for the sake of ease of installation by preventing a need for precise alignment.

In this case (red), the light-emitting member 50 should preferably be red to maximize intensity, but note that this is not strictly necessary: Even if a multi-color, multi-die LED member 50 is used, then the "undesired" colors will simply be either blocked by the film or not transmitted by the uncovered lens portion(s), whereas any "stray" light of the desired color will be directed in the useful direction.

Light that does not pass directly through the red lens portion 40R will therefore reflect laterally off of the reflective film 1010 and be ultimately directed towards the red lens portion 40R as well. The reflective film 1010 thus reduces "waste" of light energy.

The reflective member such as reflective film 1010 will typically be metallic and flexible, although this is not necessary—any material such as plastic that is highly reflective and can be formed to fit the inside or outside of the light housing will be suitable—if the chosen material is not flexible, then it should be shaped for insertion and mounting on the inside or outside of the translucent lens 40. Any mechanical or adhesive means may be used to secure the reflective film or member 1010.

Of course, if the light-emitting element 50 is red, then the lens portion 40R need not be red at all, but may be clear; in fact, in the illustrated embodiment, any or all of the lens members 40 may be clear, since only the desired color of light will be passed.

The principle shown in FIG. 10 is of course not limited to "red;" for example, if the light is to transmit only green, the reflective film may be placed so as not to block the green lens portion 400 but to reflect light back to that lens portion if it is initially directed laterally in any other direction. In such case, the light-emitting member 50 is preferably green. Similarly, covering all or much of the interior of the red and green lens portions with the reflective film 1010 but leaving the white/clear portion 40W unblocked will increase "white" light intensity assuming the correct color is used for the light-emitting member 50. One advantage of the reflective film feature is that it allows a user to "color-customize" an otherwise standard multi-color light fitting simply by applying the reflective film 1010.

I claim:

1. A light comprising:

a casing;

a light source mounted within the casing;

a fixture extending within the casing for receiving the light source so as to connect the light source to a source of electrical current;

a translucent lens, having at least a first and a second lens portion that pass light of a first and a second color, respectively;

a reflector that is mounted external to the light source within the casing;

in which:

the light source comprises a plurality of light-emitting diode (LED) elements fabricated as respective light-emitting dies on a common substrate, within a common package and a common package lens;

the plurality of LED elements includes at least one first LED element sourcing light substantially of the first color, and at least one second LED element sourcing light substantially of the second color, said sourced light of both the first and second colors being directed simultaneously without color-specific separation towards both the first and second lens portions and toward the reflector;

a primary light transmission direction of the LED elements is in an axial direction that is substantially perpendicular to an upper surface of the substrate and each of the light-emitting dies such that primary light transmission of each die is unobstructed by the other dies; and the reflector is mounted within the casing separated from and spaced apart from the light source in an axial direction such that the reflector is common to the plurality of LED elements and reflects and directs light of both the first and second colors toward the lens portions from both the first and second LED elements.

2. The light of claim 1, in which a reflective surface of the reflector has a shape substantially as a surface of rotation.

3. The light of claim 2, in which the reflective surface is concave.

4. The light of claim 1, further including a reflective material positioned on the translucent lens and extending over at least part of an angular range of any of the lens portion(s) corresponding to an unneeded light color, so as to reflect incident light towards a selected one of the lens portions corresponding to a needed light color.

5. The light as in claim 4, in which the reflective material is a reflective film.

6. The light of claim 1, further including a reflective material positioned on the translucent lens and extending over at least part of an angular range of any of the lens portion(s) corresponding to an unneeded light color, so as to reflect incident light towards a selected one of the lens portions corresponding to a needed light color.

7. The light as in claim 6, in which the reflective material is a reflective film.

* * * * *